United States Patent
Renau

(10) Patent No.: US 6,546,944 B1
(45) Date of Patent: Apr. 15, 2003

(54) FLUID SIPHON OUTLET SENSOR SYSTEM

(75) Inventor: Karol Renau, Calabasas, CA (US)

(73) Assignee: Renau Corporation, CA (US)

( * ) Notice: Subject to any disclaimer, the term of this patent is extended or adjusted under 35 U.S.C. 154(b) by 61 days.

(21) Appl. No.: 09/823,883

(22) Filed: Mar. 29, 2001

(51) Int. Cl.⁷ .............................. E04H 4/00; E03B 11/00
(52) U.S. Cl. .................... 137/2; 137/392; 137/391; 4/508
(58) Field of Search ................................ 137/392, 393, 137/391, 1, 2; 307/118; 361/178; 4/508

(56) References Cited

U.S. PATENT DOCUMENTS

| | | | | |
|---|---|---|---|---|
| 4,491,146 A | * | 1/1985 | Sveds | 361/178 X |
| 4,612,949 A | * | 9/1986 | Henson | 137/392 X |
| 6,223,359 B1 | * | 5/2001 | Oltmanns et al. | 137/392 X |

\* cited by examiner

Primary Examiner—Kevin Lee
(74) Attorney, Agent, or Firm—Fulwider Patton Lee & Utecht, LLP

(57) ABSTRACT

In a system and method for sensing and controlling the level of a fluid in a tank, the system includes a fluid inlet, for enabling the flow of fluid into the tank, and a controller, for controlling the flow of fluid through the fluid inlet. The system further includes a sensor, for sensing the level of the fluid in the tank, for activating the controller responsive thereto, and for directing the flow of fluid out of the tank. The system also includes a connector for connecting the sensor to the controller. The sensor comprises a siphon outlet tube, comprised of a conductive material, including a downwardly depending portion which includes a leading edge having a substantial surface area for contact by the fluid upon reaching a preset level in the tank.

22 Claims, 1 Drawing Sheet

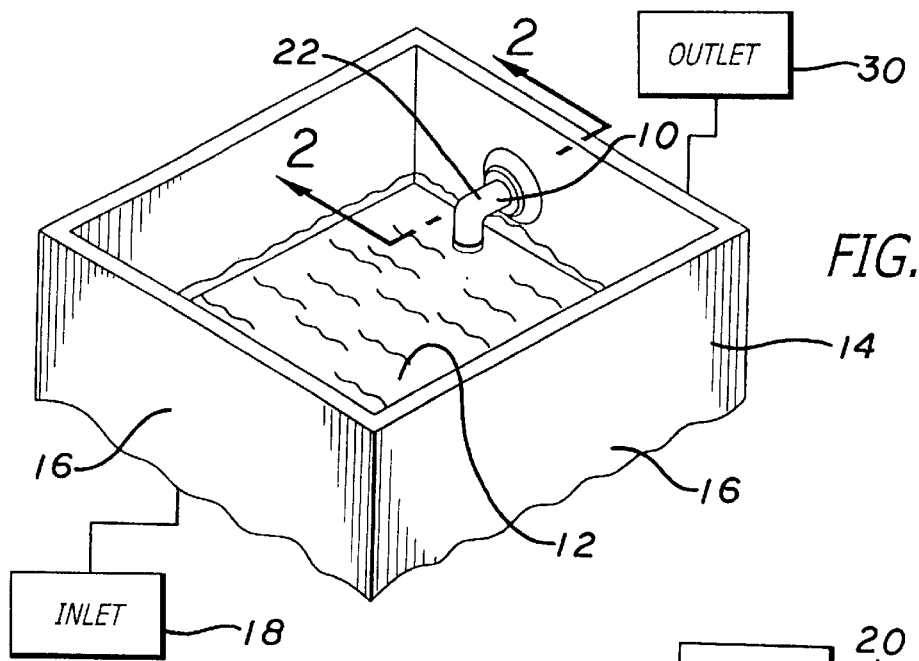
FIG. 1
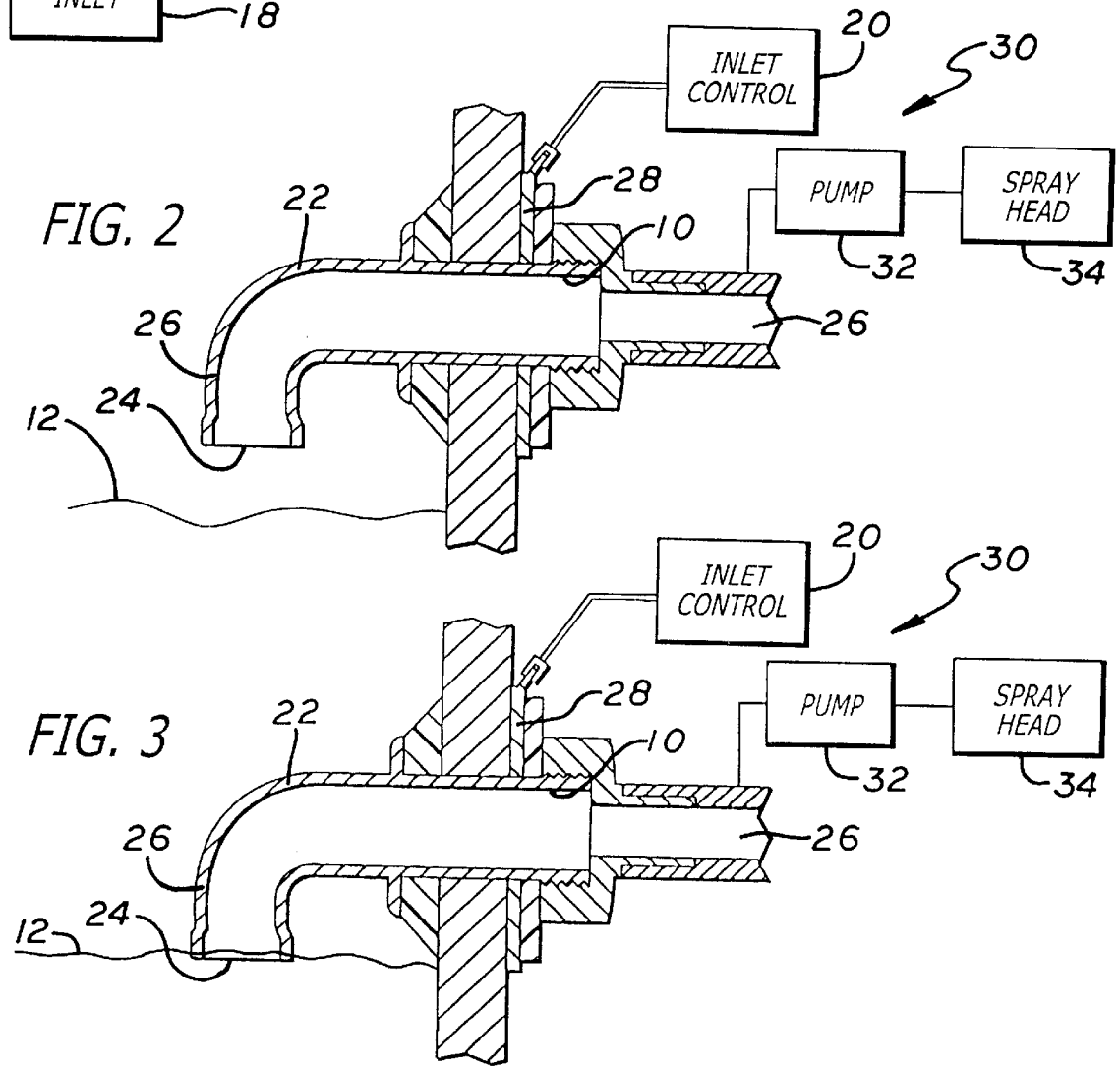
FIG. 2
FIG. 3

FLUID SIPHON OUTLET SENSOR SYSTEM

BACKGROUND OF THE INVENTION

1. Field of the Invention

This invention relates generally to improvements in fluid flow-controlling systems. In particular, the present invention relates to a fluid level sensing and controlling system, including a siphon outlet tube sensor adapted to sense the fluid level and enable the control of fluid flow, to provide enhanced fluid flow control.

2. Description of the Related Art

In a system such as a fluid heating and dispensing system, which includes a tank for containing a fluid, the fluid is heated, and the heated fluid is mixed with another component, to enable the dispensing of the heated mixture. For example, a fluid heating and dispensing system such as a coffeemaker may include a tank for containing water, wherein the water is heated and mixed with coffee to enable the dispensing of heated coffee. Such a system further includes a probe, which projects into the tank to the pre-set level for the fluid in the tank, and which is adapted to sense the pre-set fluid level, so as to enable the tank to contain a measured amount of fluid for heating and dispensing thereof.

However, it is difficult to precisely position the probe so as to extend into the tank to the desired location, to accurately establish the desired pre-set level for fluid to fill the tank. Moreover, the probe which projects into the tank is susceptible to movement thereof out of position, thereby changing the desired pre-set fluid level.

Therefore, the present invention provides improved systems and methods for enabling the level of fluid in a tank to be effectively sensed and controlled, so as to accurately establish the desired pre-set fluid level, and to prevent the changing of the position thereof.

SUMMARY OF THE INVENTION

Briefly, and in general terms, the present invention provides a new and improved system and method for sensing and controlling the level of a fluid in a tank, so as to enable the efficient control of the fluid level.

By way of example, and not by way of limitation, the present invention provides a new and improved system for sensing the level of fluid in the tank, for controlling the fluid level responsive thereto. The system includes a sensor for sensing the level of the fluid in the tank and for directing the flow of fluid out of the tank. The sensor includes a leading edge. The system also includes a fluid inlet, for enabling the flow of fluid into the tank, and a controller, for controlling the flow of fluid through the fluid inlet. The sensor is further adapted to activate the controller, responsive to sensing the level of the fluid in the tank. The system further includes a connector, for connecting the sensor to the controller.

More particularly, for example, the sensor of the present invention comprises a siphon outlet tube, comprised of a conductive material, and including a downwardly depending portion which includes the leading edge, adapted to extend into the tank. The siphon outlet tube is adapted to be mounted in the tank such that the leading edge of the downwardly depending portion thereof is at a preset level for the flow of the fluid into the tank. The leading edge includes a substantial surface area for contact by the fluid upon reaching the preset level.

The above objects and advantages of the present invention, as well as others, are described in greater detail in the following description, when taken in conjunction with the accompanying drawings of illustrative embodiments.

BRIEF DESCRIPTION OF THE DRAWINGS

FIG. 1 is a perspective view of a fluid level sensing and controlling system, in accordance with an embodiment of the present invention;

FIG. 2 is a side cross-sectional view of a sensor, taken along line 2—2 in FIG. 1, wherein the fluid is not in contact with the sensor, in the practice of the invention; and FIG. 3 is a similar view of the sensing-directing element, wherein the fluid is in contact with the leading edge thereof, pursuant to the invention.

DETAILED DESCRIPTION OF THE PREFERRED EMBODIMENTS

The present invention is directed to an improved system and method for sensing and controlling the level of a fluid in a tank, in and efficient and effective manner. The improved system and method provides effective and efficient control of the level of the flow of fluid into the tank, upon sensing the fluid level. The preferred embodiments of the improved system and method are illustrated and described herein by way of example only and not by way of limitation.

Referring to the drawings, wherein like reference numerals denote like or corresponding parts throughout the drawing figures, and particularly to FIGS. 1–3, in a preferred embodiment of a system in accordance with to the invention, for example, a system 10 is provided for sensing and controlling the level of a fluid 12 in a tank 14. The fluid 12 preferably comprises a conductive fluid, which for example may comprise water. The tank 14 includes a plurality of walls 16. The system 10 includes a fluid inlet 18 for enabling the flow of the fluid 12 into the tank 14. It further includes a controller 20 for controlling the flow of the fluid 12 through the fluid inlet 18. The system further includes a sensor 22 for sensing the level of the fluid 12 in the tank 14 and activating the controller 20 responsive thereto, and for directing the flow of the fluid 12 out of the tank 14.

As illustrated in FIGS. 1–3, in the preferred embodiment, the sensor 22 includes a leading edge 24, and comprises a siphon outlet tube. The siphon outlet tube 22 is adapted to extend through one of the walls 16 of the tank 14 and into and out of the tank 14. It includes a downwardly depending portion 26 which includes the leading edge 24, adapted to extend into the tank 14. It is preferably comprised of a conductive material such as for example a metal. The siphon outlet tube 22 is adapted to be mounted in the tank 14 such that the leading edge 24 of the downwardly depending portion 26 is at a preset level for the flow of the fluid 12 into the tank 14. The leading edge 24 includes a substantial surface area for contact by the fluid 12 upon reaching the preset level. The controller 20 is adapted to measure the resistance between the level of the fluid 12 in the tank 14 and the leading edge 24 of the siphon outlet tube 22.

Pursuant to the present invention, as shown in FIGS. 1–3, the system 10 also includes a connecting element 28 for connecting the sensor 22 to the controller 20. The system 10 also includes a fluid outlet 30, for enabling the flow of the fluid 12 out of the tank 14, which includes a pump 32 and a fluid spray head 34.

In the present invention, the system 10 is adapted to be incorporated in a device such as a coffeemaker for dispensing a heated fluid such as a heated coffee mixture of heated water and coffee, which device includes the siphon outlet tube 22 therein. The siphon outlet tube 22 provides a pre-set amount of the fluid 12 in the tank 14 for heating and dispensing of the heated fluid 12.

Referring to FIGS. 1–3, in a preferred method of operation of the system 10 of the invention, for example, the fluid inlet 18 is actuated to enable the fluid 12 such as water to flow into the tank 14. The flow of the fluid 12 into the tank 14 is controlled by the substantial surface area of the leading edge 24 of the downwardly depending portion 26 of the metal siphon outlet tube 22, which senses the level of fluid 12 in the tank 14, and activates the controller 20 responsive thereto. The controller 20 measures the resistance between the level of the conductive fluid 12 in the tank 14 and the metal leading edge 24 of the conductive metal siphon outlet tube 22.

As shown in FIGS. 2–3, until the level of the fluid 12 in the tank 14 comes into contact with the preset level at the leading edge 24 of the siphon outlet tube 22, the gap between the level of the conductive fluid 12 and the metal leading edge 24, which comprises an air gap, functions as an insulator. This provides a high resistance, as measured by the controller 20, which prevents the controller from closing the fluid inlet 18, enabling the further flow of the fluid 12 into the tank 14. When the level of the fluid 12 in the tank 14 contacts the leading edge 24 of the siphon outlet tube 22, there is no gap therebetween, and there is no resistance as measured by the controller 20, enabling the controller 20 to actuate the fluid inlet 18 for closing thereof, preventing the further flow of the fluid 12 into the tank 14. The controller 20 is actuated to open the fluid inlet 18, and the pump 32 and the spray head 34 of the fluid outlet 30 are actuated for dispensing of the fluid 12 as needed.

While the present invention has been described in connection with the specific embodiments identified herein, it will be apparent to those skilled in the art that many alternatives, modifications and variations are possible in light of the foregoing description. Accordingly, the invention is intended to embrace all such alternatives, modifications and variations as may fall within the spirit and scope of the invention as disclosed herein.

What is claimed is:

1. A system for sensing and controlling the level of a fluid in a tank comprising:
    a fluid inlet, for enabling the flow of fluid into the tank;
    a controller, for controlling the flow of fluid through the fluid inlet;
    a sensor, for sensing the level of the fluid in the tank and activating the controller responsive thereto, and for directing the flow of fluid out of the tank, wherein the sensor includes a leading edge; and
    a connector, for connecting the sensor to the controller wherein the controller is adapted to measure the resistance between the level of fluid in the tank and the leading edge of the sensor.

2. The system of claim 1, wherein the sensor comprises a siphon outlet tube.

3. The system of claim 1, further comprising a fluid outlet, for enabling the flow of fluid out of the tank, including a fluid spray head.

4. The system of claim 1, wherein the fluid comprises a conductive fluid.

5. The system of claim 2, wherein the siphon outlet tube includes a downwardly depending portion which includes the leading edge, adapted to extend into the tank.

6. The system of claim 2, wherein the tank includes a plurality of walls, and the siphon outlet tube is adapted to extend through one of the plurality of walls of the tank and into and out of the tank.

7. The system of claim 2, wherein the siphon outlet tube is comprised of a conductive material.

8. The system of claim 4, wherein the conductive fluid comprises water.

9. The system of claim 5, wherein the siphon outlet tube is adapted to be mounted in the tank such that the leading edge of the downwardly depending portion thereof is at a preset level for the flow of fluid into the tank.

10. The system of claim 5, wherein the leading edge includes a substantial surface area for contact by the fluid upon reaching the preset level.

11. The system of claim 7, wherein the conductive material comprises a metal.

12. A method of sensing and controlling the level of a fluid in a tank, in a system which comprises a fluid inlet, for enabling the flow of fluid into the tank, a controller, for controlling the flow of fluid through the fluid inlet, a sensor, for sensing the level of the fluid in the tank and activating the controller responsive thereto, and for directing the flow of fluid out of the tank, wherein the sensor includes a leading edge, and a connector, for connecting the sensor to the controller, wherein the controller is adapted to measure the resistance between the level of fluid in the tank and the leading edge of the sensor, wherein the method comprises:
    enabling fluid to flow through the fluid inlet into the tank; and
    controlling the flow of fluid into the tank, including sensing the level of fluid in the tank, and activating the controller responsive thereto;
    wherein controlling comprises measuring the resistance between the level of fluid in the tank and the leading edge of the sensor.

13. The method of claim 12, wherein the sensor comprises a siphon outlet tube, further comprising enabling the flow of fluid out of the tank, comprising enabling the flow of fluid through the siphon outlet tube.

14. The method of claim 12, further comprising a fluid outlet, for enabling the flow of fluid out of the tank, including a fluid spray head, further comprising enabling the flow of fluid out of the tank, comprising enabling the flow of fluid through the fluid spray head.

15. The method of claim 12, wherein the fluid comprises a conductive fluid, and wherein enabling fluid to flow into the tank comprises enabling a conductive fluid to flow into the tank.

16. The method of claim 13, wherein the siphon outlet tube includes a downwardly depending portion which includes the leading edge, adapted to extend into and out of the tank, and wherein enabling the flow of fluid into the tank comprises enabling the flow of fluid into the tank until the fluid contacts the leading edge in the downwardly depending portion of the siphon outlet tube.

17. The method of claim 13, wherein the tank includes a plurality of walls, and the siphon outlet tube is adapted to extend through one of the plurality of walls of the tank and into and out of the tank, and wherein the enabling the flow of fluid out of the tank comprises enabling the flow of fluid through the siphon outlet tube mounted in the tank wall and extending into and out of the tank.

18. The method of claim 13, wherein the siphon outlet tube is comprised of a conductive material, and wherein enabling the flow of fluid into the tank comprises enabling the flow of fluid into the siphon outlet tube comprised of a conductive material.

19. The method of claim 15, wherein the conductive fluid comprises water, and wherein enabling fluid to flow into the tank comprises enabling water to flow into the tank.

20. The method of claim 16, wherein the siphon outlet tube is adapted to be mounted in the tank such that the leading edge of the downwardly depending portion thereof is at preset level for the flow of fluid into the tank, and wherein enabling the flow of fluid into the tank comprises enabling the flow of fluid into the tank to the preset level at the leading edge of the siphon outlet tube.

21. The system of claim 16, wherein the leading edge includes a substantial surface area for contract by the fluid upon reaching the preset level, and wherein enabling the flow of fluid into the tank comprises enabling the flow of fluid into the tank until the fluid contacts the substantial surface area of the leading edge.

22. The method of claim 18, wherein the conductive material comprises a metal, and wherein enabling the flow of fluid into the tank comprises enabling the flow of fluid up to the metal siphon outlet tube.

* * * * *

UNITED STATES PATENT AND TRADEMARK OFFICE
CERTIFICATE OF CORRECTION

PATENT NO. : 6,546,944 B1
DATED : April 15, 2003
INVENTOR(S) : Karol Renau

It is certified that error appears in the above-identified patent and that said Letters Patent is hereby corrected as shown below:

<u>Title page,</u>
Item [*] Notice, change "61 days" to read -- 78 days --.

Signed and Sealed this

Twelfth Day of August, 2003

JAMES E. ROGAN
*Director of the United States Patent and Trademark Office*